July 28, 1959 W. D. WILSON 2,896,526
MOUNTING MEANS FOR A REMOVABLE GRILL
Filed Aug. 1, 1956
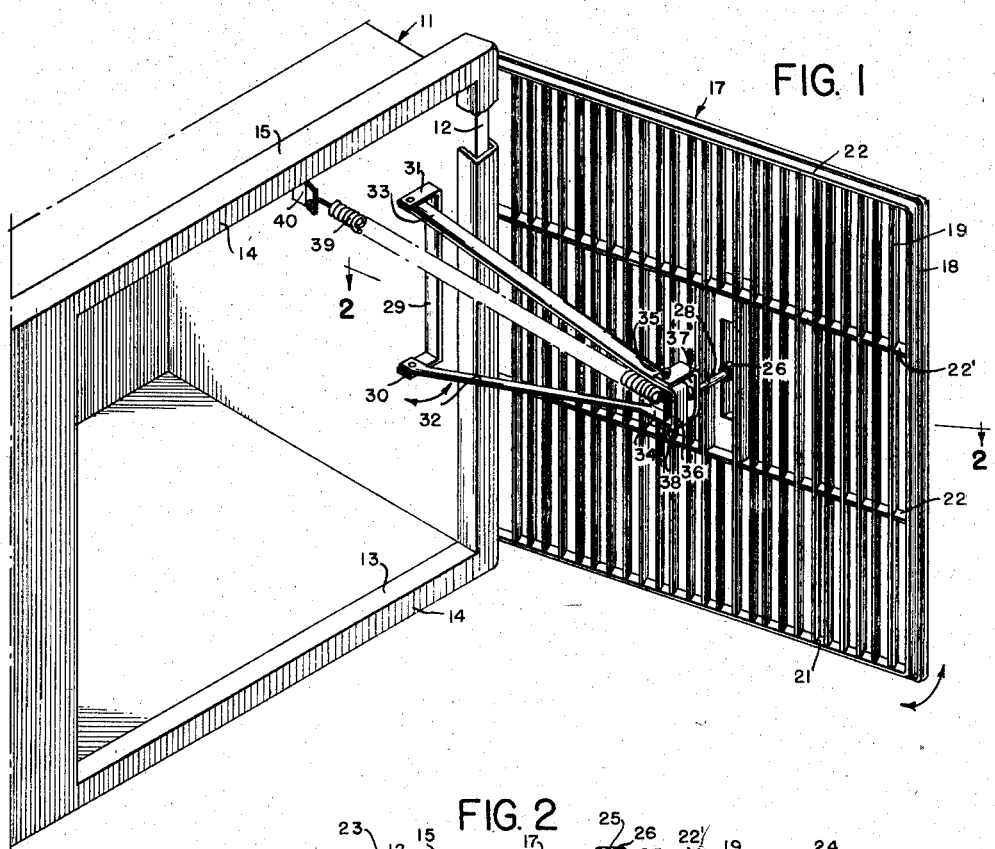
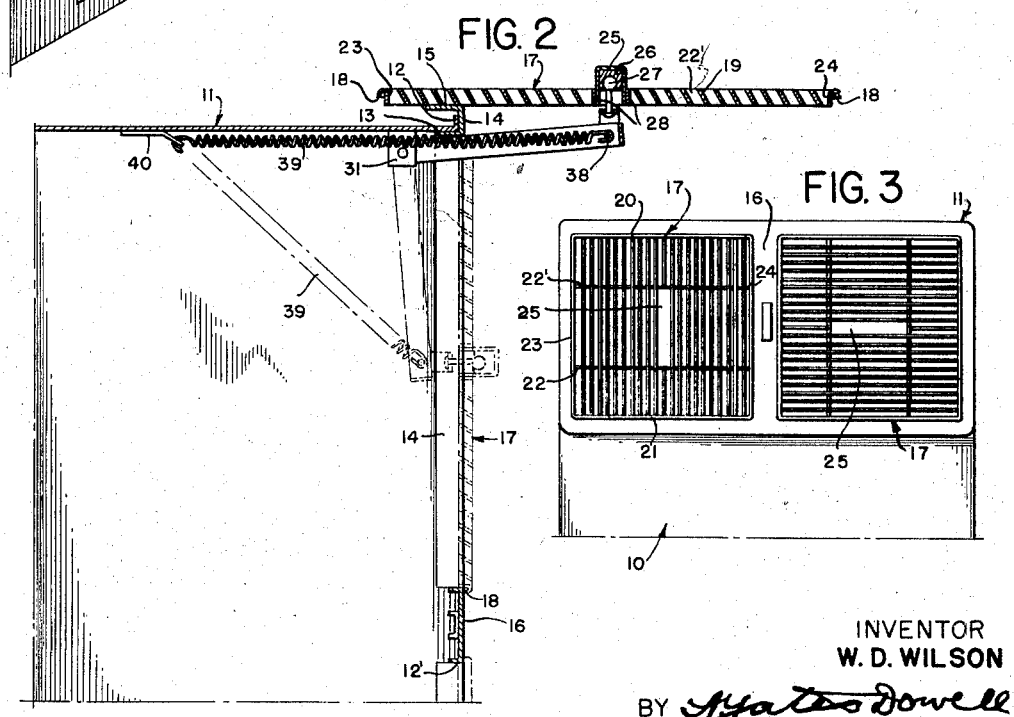
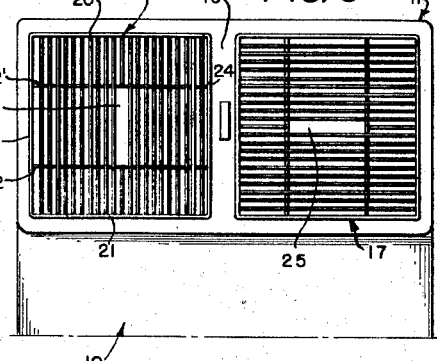
INVENTOR
W. D. WILSON
BY *Yates Dowell*
ATTORNEYS

United States Patent Office 2,896,526
Patented July 28, 1959

2,896,526

MOUNTING MEANS FOR A REMOVABLE GRILL

William Dye Wilson, Winters, Tex., assignor to Winters Manufacturing Company, Winters, Tex.

Application August 1, 1956, Serial No. 601,495

7 Claims. (Cl. 98—108)

The present invention relates to closure and, more particularly, to mounting means for grills adapted to close an opening in air conditioning units, which grills are movable from a closed to an open position and adjustable for controlling the passage of air therethrough.

Heretofore, grills have been provided for the passage of air while partially obstructing an opening to prevent large articles from passing through the opening and to prevent injury to persons who might otherwise obtain access to the interior of a cabinet and might be injured by equipment in the cabinet.

However, the grills and the mounting therefor in the structures of the prior art have been of a nature to permit rattling due to the vibration and of a nature to make access to the interior mechanism difficult. Frequently for small adjustments of the mechanism on the interior of a cabinet more time was required to obtain access to the mechanism than was required for the actual adjustment or repair of the mechanism. Also the prior grills were not of a type to provide for directing air in the proper direction nor did they properly hide the structure in the rear of the grill. As a result, the prior structures have not been entirely satisfactory.

An object of the present invention is to provide a movable mounting for a closure or grills which overcomes the defects enumerated above.

A further object is to provide a supporting structure for a closure which will maintain the closure in either open or closed position.

Another object of the invention is to provide a grill and a mounting therefor adapted to be applied to an opening in existing cabinets so that the grill may be effectively retained in either its closed position or in its open position.

A further object is to provide a grill with louvers arranged at an angle to the plane of the grill so that the passage of air will be in the direction of the angularly arranged louvers and to provide for changing the position of the grill for directing the air in different selected direction.

Other and further objects will be apparent as the description proceeds and upon reference to the accompanying drawing wherein:

Fig. 1 is a perspective view of a portion of the cabinet showing the right hand grill, mounting means and a spring to maintain the grill and its mounting means in an open position as shown in full lines or in a closed position;

Fig. 2, a section taken on line 2—2 of Fig. 1 with a dotted line position showing the grill in closed position but with such grill in the closed position in a different relation to the crane for directing air in a different direction; and Fig. 3, a fragmentary front view of a cabinet having two grill closure means of the present invention applied thereto with the left grill having its louvers arranged vertically as shown in full lines in Figs. 1 and 2, and with the right grill having its louvers arranged horizontally.

Briefly, the present invention relates to an air conditioning unit having an opening for the passage of conditioned air and a closure in the form of a grill for closing such opening, the grill being movably mounted on the cabinet by means of a U-shaped bracket fixed to the side wall of the cabinet with a V-shaped crane pivotally mounted by the free ends of its legs to the free ends of the legs of the U-shaped brackets.

Pivotally mounted on an axis parallel to the pivotal mounting of the crane on the bracket is a mounting means which has a stud portion extending to the grill and on the other end of which stud portion a closure grill is pivotally mounted for rotation about the axis passing through the center of gravity of such grill and transverse to the crane supporting the grill, whereby the grill may be rotated to fit the closure in a number of different positions, the grill having a substantially square outline and the opening in the cabinet being substantially square so that the grill may close the opening in any one of four positions. The grill is preferably provided with louvers arranged at an angle to the plane of the grill so that air passing through the grill will be directed by the louvers in the selected direction in accordance with the position of the grill on the opening.

The V-shaped crane and the grill mounted thereon are maintained in both open and closed positions by a tension spring, one end of the spring being mounted on the cabinet and the other end of the spring mounted on the crane so the effective force of the spring passes through the axis of the crane and the bracket thereby resiliently retaining the grill in its open position to provide access to the interior of the cabinet and also maintaining the grill in a closed position under resilient force to prevent vibration which may be caused by the operation of the mechanism in the cabinet.

Referring more particularly to the drawing an air conditioning cabinet or housing 10 shown in phantom outline having the usual air cooling means therein such as a refrigeration unit or an evaporative cooler is provided with a duct 11 projecting forwardly for directing air into an enclosure such as a room through a window opening or the like. The duct 11 is open at the front and has an outwardly extending flange 12 around its outer periphery. A skeleton frame structure extends completely around the front opening of the duct 11 and has an inner flange 13 overlapping the inside of the duct 11 connected by a web portion 14 to an outer flange 15 extending rearwardly thereby providing a neat appearance to the edge of the duct 11 while a center upright 16 divides the opening into two windows which are closed by grills 17, 17 each having an outwardly extending flange 18 which overlaps the connecting portion 14 of the frame and the upright 16.

Each grill includes a series of louvers 19 which extend between top and bottom members 20 and 21, with connecting elements 22' extending between ends 23 and 24 of the grill, thereby providing a grill for directing air laterally from the duct 11. The top and bottom members 20, 21 and ends 23, 24 are of angle shape providing a peripheral rim projecting inwardly from the outer surface of the grill and extending into the opening of the skeleton frame so the rim is generally parallel to flanges 13 when the grill 17 is in closed position, the flange 18 overlapping portions 14, 16 of the skeleton frame. Centrally located in the grill is a channel-shaped handle member 25 having an associated centrally disposed boss 26 which receives a ball 27 on the end of a rod 28 whereby the grill may rotate and oscillate about the ball 27.

A U-shaped bracket having a bight portion 29 and a lower leg 30 and upper leg 31 is fastened by the bight portion to the side of the duct 11 by any suitable means, such as welding or the like.

A V-shaped crane having a lower arm 32 and an upper arm 33 is pivotally connected by its arms to legs 30 and 31 respectively of the U-shaped bracket with the apex of the the V-shaped crane having parallel portions 34 and 35 connected by a portion 36.

A U-shaped mounting means is fixed by its bight portion 37 to the rod 28 and is pivotally connected to the parallel portions 34 and 35 by means of a cotter pin 38 passing through the legs to the U-shaped mounting means 37 and the parallel portions of the V-shaped crane whereby the mounting means and the grill carried thereby may rotate on an axis parallel to the axis of pivotal movement of the V-shaped crane on the U-shaped bracket.

A tension spring 39 is fixed at one end to an angle bracket 40 secured to the side wall of the duct 11, the other end of the spring 39 being pivotally connected on the cotter pin 38 passing through mounting means 37. The arrangement of the points of connection of the ends of the spring 39 to the angle bracket 40 and cotter pin 38 is such that the spring passes through the axis formed by the pivots between the crane arms 32 and 33 and the legs 31 and 30 respectively of the U-shaped supporting bracket. The grill 17 on the right is shown in its open position in full lines in Figs. 1 and 2, and it will be noted that the spring 39 is located outwardly of the pivotal axis between the V-shaped crane and the U-shaped mounting bracket.

The grill 17 is shown in closed position in dotted lines in Fig. 2 with the spring 39 shown in dotted lines on the inside of the pivotal axis between the V-shaped crane and the U-shaped bracket for exerting a constant tension on the U-shaped mounting means and rod 28 thereby obtaining a constant resilient pressure between the flanges 18 of grill 17 and the edges of the window opening.

In Figs. 1 and 2 the grill as shown in full lines would direct air outward laterally, but the grill may be rotated through 360° and when it is rotated 180° from the full line position the louvers are arranged as shown in the dotted line position of the grill 17 in Fig. 2 so as to direct the outgoing air laterally and toward the opposite side of the duct 11. Also each grill may be rotated about its center rod 28 so the louvers extend horizontally as shown at the right in Fig. 3 for directing the air either upwardly or downwardly in accordance with the direction of the slope of the louvers 19 resulting from the position of grill 17.

From the above description it will be evident that applicant has provided a closure of general utility which has resilient means to maintain the closure in closed position with the same resilient means serving to maintain the closure in open position upon sufficient movement of the closure beyond a dead center position of the resilient means. When the closure means are used on an air conditioning unit the air may be directed in any desired direction by the rotation of the grill about the rod 28. Although the invention has been described as particularly useful in air conditioning units, it will be evident that the invention has utility in numerous other applications.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. An air conditioning unit cabinet structure having an opening through which conditioned air may pass, a grill of sufficient size to close said opening, said grill having inclined louvers and a continuous peripheral rim projecting inwardly from the outer surface of the grill and extending within the boundaries of said opening and having an outwardly extending flange projecting along the exposed surface of the cabinet adjacent the opening, a U-shaped bracket fixed by its bight portion to the inside of the cabinet, a V-shaped crane pivotally mounted by the free ends of its legs to said U-shaped bracket for movement about a first pivot axis, a U-shaped mount pivotally mounted on the apex of said V-shaped crane for swinging movement about a second pivot axis parallel to the first pivot axis of said crane on said bracket, an element connected to said U-shaped mount at one end and universally connected at its other end to said grill substantially at the center of gravity of said grill, a tension spring connected at one of its ends to said cabinet inwardly of said U-shaped bracket and connected at its other end to the apex of said V-shaped crane, the said tension spring being adapted to pass transversely through the first pivot axis between the free ends of said V-shaped crane and said U-shaped bracket whereby the crane may be urged in a direction to maintain said crane projecting outwardly of said cabinet and alternately to a position, in which said crane is urged inwardly of said cabinet, the spring being positioned on the side of the first pivot axis adjacent the wall of the cabinet when the grill is in open position, the spring being positioned on the opposite side of the first pivot axis when the grill is in closed position, a handle mounted on said grill adjacent the center thereof whereby a person may grip said handle and position said grill in various angles of rotation and the inclined louvers in said grill may direct air in a selected direction in accordance with the angular position of said grill in said opening so that air may be directed up, down, to the left or to the right.

2. An air conditioning unit including a housing having an opening through which conditioned air may pass, a grill of a size to close said opening, a crane pivotally mounted by one of its ends to the housing for movement about an axis, means pivotally connected to the other end of said crane and connected to said grill, said other end of said crane and said pivotally connected means providing a grill mounting means, a spring connected at one end to said housing and connected at the other end to said grill mounting means, the connection of said one end of said spring to said housing being located so said spring passes transversely through the axis for pivotally mounting of said one end of said crane as the grill is moved from closed to open position whereby the crane may be urged by said spring in a direction to maintain said crane projecting outwardly of said housing with the spring force on one side of said axis or with the crane projecting inwardly of said housing with the spring force on the other side of said axis.

3. A closure structure for mounting on a frame comprising a closure for movement from a closed to an open position and to be maintained in said open or closed position comprising a bracket for mounting within said frame, a crane having an end pivotally connected on said bracket for movement about a first pivot axis, means to pivotally mount said closure at the other end of said crane for movement about a second pivot axis at the other end of said crane, a spring for reaction between the frame and said crane, means to attach one end of said spring to said crane, means to attach the other end of said spring to the frame, said spring serving to maintain said crane in a position to hold said closure in open position with the effective force of said spring being on one side of said first pivot axis of said crane, said spring also being effective to maintain said closure in closed position with the effective force of the spring on the other side of said first pivot axis between said crane and said bracket.

4. A closure structure for an access opening of a cabinet comprising a cover of a size to close said access opening and constructed to permit removal of said cover from the access opening in one direction only, a bracket for mounting in said cabinet, said bracket having first pivot means, an arm pivotally mounted on one end on the said first pivot means of said bracket and adapted to swing about said first pivot means so that the other end of said arm can move inwardly and outwardly of said access opening, second pivot means to pivotally mount said cover on the other end of said arm in a position for said cover to close said opening and resilient means connected at one end to said arm at a point spaced from said first pivot means and connectable to a fixed point in said cabinet so the ends of said resilient means are located in spaced relation to said first pivot means so that movement of said arm from its inward to its outward position causes a line between said point on said arm and said point in said cabinet to pass through the axis of said first pivot means for maintaining said cover in open position.

5. An air conditioner comprising a cabinet having a window opening for the discharge of conditioned air, a crane pivotally mounted on an axis spaced from said window opening both inwardly of the plane of the opening and inwardly of an edge thereof, a closure swivelly mounted on the other end of said crane for closing and opening, a tension spring extending between the said other end of the crane and said air conditioner, said spring being connected at one of its ends to the said other end of the crane and being connected at its other end to the air conditioner at a point within the air conditioner so that in moving the closure from its position closing the window opening to its open position the line of action of the force of the spring passes transversely through the axis of the pivotal mounting of the crane to cause the crane to be selectively retained in either an extended position in which the closure is spaced from the window opening with the force of the spring on one side of said axis or retained in a closed position in which the closure is engaged with the edge of the window opening with the force of the spring on the other side of said axis so that a resilient force is constantly applied to the closure in its closed position.

6. The invention according to claim 5 in which the closure is provided with louvers for directing air laterally of the window and in which the closure is mounted for adjustment of the closure to change the direction of lateral movement of the air passing therethrough.

7. A structure for mounting a closure on a housing having an opening for movement of the closure from a closed to an open position with respect to said opening and to maintain the closure in said open or closed position comprising a bracket for mounting within said housing, a crane having an end pivotally connected on said bracket for movement about a first pivot axis, means to pivotally mount a closure at the other end of said crane for movement about a second pivot axis at the said other end of said arm, resilient tension means for reaction between the housing and said crane, means to attach one end of said resilient tension means to said crane and means to attach the other end of said resilient tension means to the housing, said resilient tension means serving to maintain said crane in a position to hold said closure in open position with the line of action of the effective force being on one side of the first pivot axis of said crane, said resilient tension means also being effective to maintain said closure in closed position with the line of action of the effective force of the resilient tension means on the other side of said first pivot axis between said crane and said bracket.

References Cited in the file of this patent

UNITED STATES PATENTS

| | | |
|---|---|---|
| 1,475,103 | Wood | Nov. 20, 1923 |
| 1,720,789 | Heusser | July 16, 1929 |
| 2,003,045 | Griffiths | May 28, 1935 |
| 2,467,309 | Hart et al. | Apr. 12, 1949 |
| 2,651,542 | Meyer | Sept. 8, 1953 |
| 2,731,011 | Maier | Jan. 17, 1956 |
| 2,777,599 | Waas | Jan. 15, 1957 |
| 2,823,663 | Aten et al. | Feb. 18, 1958 |